Patented Dec. 26, 1950

2,535,705

UNITED STATES PATENT OFFICE

2,535,705

4 - NEOPENTYL - 1,2 - DITHIA - 4 - CYCLOPENTENE - 3 - THIONE AND 4-METHYL-5-TERTIARY - BUTYL - 1,2 - DITHIA - 4 - CYCLOPENTENE-3-THIONE

Donald R. Stevens, Wilkinsburg, and William C. Starnes, Pittsburgh, Pa., assignors to Gulf Research & Development Company, Pittsburgh, Pa., a corporation of Delaware No Drawing. Application March 7, 1947, Serial No. 733,196

13 Claims. (Cl. 260—327)

1

This invention relates to new chemical compounds and mixtures of the same, and to a method of preparing such compounds and mixtures thereof by reaction between elemental sulfur and di-isobutylene. These compounds are two in number and both have the empirical formula $C_8H_{12}S_3$. Accordingly, they are isomeric with each other. One of the compounds is a bright orange-colored crystalline solid having a melting point of about 87° C.; the other is a reddish-orange crystalline solid having a melting point of about 80° C. Both are substantially insoluble in water, but are soluble in a variety of organic solvents, including benzene, acetone, methanol, pentane, and ethyl ether. They are useful as chemical intermediates and as additives in certain hydrocarbon fuel compositions.

The new chemical compounds provided by the invention are formed simultaneously by direct reaction between sulfur and di-isobutylene at somewhat elevated temperatures and pressures. The di-isobutylene reactant is preferably employed in substantially pure form, although it may be employed in admixture with other hydrocarbons, e. g., as it occurs in the hydrocarbon mixture obtained by the cold acid polymerization of butylenes.

The reaction takes place readily at temperatures above about 140° C. under autogenic pressure. Accordingly, it is conveniently carried out simply by charging the desired quantities of the two reactants into an autoclave or other suitable pressure vessel, and heating to the desired reaction temperature. Ordinarily, the reaction is carried out at temperatures between about 140° C. and about 200° C., but if it is desired to favor the yield of the isomer which melts at 80° C., higher temperatures, e. g. up to about 350° C., are employed. The time required for completion of the reaction varies with the temperature employed as well as with the purity of the reactants and the ratio in which they are employed. At a reaction temperature of about 350° C., for example, the reaction is substantially complete in as little as 10 minutes or less, whereas at a temperature of about 170° C., completion of the reaction may take 3–5 hours, and at lower temperatures may take as long as 10 hours. Ordinarily, the reaction is considered complete when the pressure within the reaction vessel levels off at a constant value. The molar ratio of reactants may be varied between about 1 and about 5 moles of sulfur per mole of di-isobutylene, but optimum yields of the crystalline compounds are usually obtained when employing about 2.5 moles of sulfur per mole of di-isobutylene.

Upon completion of the reaction, the crude reaction product is obtained in the form of a dark oily liquid, usually containing a small quantity of unreacted sulfur and having the odor of hydrogen sulfide. The desired $C_8H_{12}S_3$ compounds are readily recovered from the crude liquid reaction product by dissolving the latter in a miscible organic solvent, e. g., petroleum ether, pentane, toluene, etc., filtering off any unreacted sulfur, and thereafter cooling the resulting solution until the solid products precipitate out of solution as a mass of orange-colored crystals which are then filtered off and washed with small quantities of the solvent. In some instances, particularly when the crude liquid product has been allowed to stand in the reaction vessel for an extended period of time, it may be found that a small quantity of the $C_8H_{12}S_3$ compounds has crystallized out of solution. These crystals may be recovered by an initial filtration of the crude reaction product, and then added to the main bulk of the crystallized product prior to the washing step.

The crystalline product isolated from the crude reaction product as described above consists of a mixture of the two $C_8H_{12}S_3$ compounds. The ratio in which the two isomers occur in such mixture depends somewhat upon the conditions of the sulfurization reaction and upon the particular organic solvent employed in recovering the mixture from the crude reaction product. Ordinarily, however, the mixture will contain about 25–40 per cent by weight of the $C_8H_{12}S_3$ isomer which melts at about 80° C., and about 60–75 per cent by weight of the isomer melting at about 87° C. This mixed product is an orange-colored crystalline solid having a melting point between about 50° and about 70° C., depending upon the ratio in which its two components are present. For many purposes, the mixture may be employed in lieu of either of the pure compounds, and in certain instances it may even be preferred. For example, in employing the new compounds as additives in certain petroleum fuel compositions, as hereinafter more fully explained, the mixed compounds are usually preferred for such use, since the mixture is more soluble in petroleum fractions than either of the pure compounds. Accordingly, the mixture need not be separated into its components, but may advantageously be marketed and used as such.

When desired, the individual $C_8H_{12}S_3$ compounds may be separated from a mixture thereof by fractional crystallization from solution in an organic solvent such as petroleum ether, methanol, acetone, diethyl ether, ethanol, chloroform, etc. The higher-melting isomer is in most cases slightly less soluble in organic solvents than the low-melting compound, and accordingly it may be isolated by repeated crystallizations from organic solvent solutions. The lo-melting isomer may be recovered from the combined mother liquors from such a series of crystallizations. Among the various organic solvents which may be employed in separating the isomers by fractional crystallization, chloroform has been found to have superior differential solvent power for the two isomers. Accordingly, a preferred method for separating the isomers consists in dissolving the mixture in chloroform and thereafter cooling the resulting solution to a low temperature to permit the higher-melting isomer to crystallize out of solution. The crystals may be separated from the mother liquor by filtration or centrifuging, and if an especially pure product is desired, it may be subjected to a second crystallization from chloroform solution. Ordinarily, however, a single crystallization will yield a product of sufficient purity for most purposes. The low-melting isomer is preferably recovered from the chloroform mother liquors by evaporating off the chloroform and purifying the residue by one or more crystallizations from an organic solvent such as petroleum ether, pentane, diethyl ether, etc.

The following examples will illustrate several ways in which the principle of the invention has been applied, but are not to be construed as limiting the same.

EXAMPLE I

Approximately 224 parts by weight of diisobutylene, consisting of about 80 per cent by weight of 2,4,4-trimethyl-pentene-1 and about 20 per cent by weight of 2,4,4-trimethyl-pentene-2 and approximately 320 parts by weight of sulfur were charged into an electrically-heated rotating autoclave and heated at a temperature of about 170° C. for 3 hours. During the heating the maximum pressure developed within the autoclave was about 150 pounds per square inch. The crude reaction product obtained was a dark oily liquid having an odor of hydrogen sulfide. It was filtered to remove any unreacted sulfur, and was then diluted with an equal volume of pentane. The pentane solution was chilled to a temperature of about −80° C., whereby there separated out of solution an orange-colored crystalline mass comprising the two isomeric $C_8H_{12}S_3$ compounds. The crystalline product was filtered off and dissolved in an equal amount of chloroform. Upon cooling the chloroform solution to a temperature of about −80° C., a bright orange-colored crystalline solid separated out of solution. This product was filtered off and was further purified by a second crystallization from chloroform solution. The recrystallized product had a melting point of about 87° C., and the following analysis:

|  | Found | Calculated For $C_8H_{12}S_3$ |
| --- | --- | --- |
| Carbon per cent | 47.09 | 47.06 |
| Hydrogen do | 6.01 | 5.88 |
| Sulfur do | 47.03 | 47.07 |
| Molecular Weight | 204 | 204 |

Further analytical data and chemical characteristics indicate that this product is probably 4-neopentyl-$\Delta^4$-dithiacyclopenteno-3-thione, or by a different nomenclature, 4-neopentyl-1,2-dithia-4-cyclopentene-3-thione, having the structural formula:

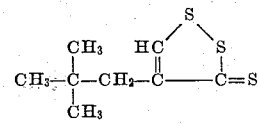

The chloroform mother liquors obtained above were combined and heated to evaporate the chloroform, whereby there was obtained a dark-colored oily viscous liquid. This material was diluted with equal volumes of pentane and diethyl ether and was cooled to a temperature of about −80° C., whereby an orange-colored crystalline product separated out of solution. This product was filtered off and was purified by several recrystallizations from a mixture of pentane and diethyl ether. When dried, the recrystallized product was appreciably different in color from the orange-colored crystalline product previously isolated, being darker and having a distinct reddish cast. It had a melting point of about 80° C., and the following analysis:

|  | Found | Calculated for $C_8H_{12}S_3$ |
| --- | --- | --- |
| Carbon per cent | 47.13 | 47.06 |
| Hydrogen do | 6.03 | 5.88 |
| Sulfur do | 47.15 | 47.07 |
| Molecular Weight | 211 | 204 |

Further analytical data and chemical characteristics indicate that this product is probably 4-methyl-5-tert-butyl-1,2-dithia-4-cyclopentene-3-thione.

EXAMPLE II

Approximately 84 parts by weight of di-isobutylene, consisting of about 80 per cent by weight of 2,4,4-trimethyl-pentene-1 and about 20 per cent by weight of 2,4,4-trimethyl-pentene-2, and about 96 parts by weight of sulfur were heated together in a closed vessel at a temperature of 150°–160° C. for about 10 hours. During the heating, the maximum pressure developed within the vessel was about 75 pounds per square inch. At the end of the heating period, the vessel was allowed to cool, after which it was opened and the contents were withdrawn. The crude reaction product so obtained was a viscous dark red oil having the odor of hydrogen sulfide and containing a small amount of a crystalline solid material. The entire product was dissolved in an equal volume of ethyl ether and was filtered to remove any unreacted sulfur. The filtered solution was then allowed to stand at 0° C. for 4 hours, whereby an orange-colored solid crystallized out of solution. This product was filtered off and was recrystallized several times from hot ethyl alcohol solution to obtain a pure product having a melting point at 86.5°–87.3° C. Carbon, hydrogen, sulfur, and molecular weight determinations showed this product to have the empirical formula $C_8H_{12}S_3$. The ethyl alcohol mother liquors were not processed in this instance for recovery of the lower-melting isomer.

EXAMPLE III

Approximately 336 parts by weight of butylene dimer, obtained by the cold acid polymerization of mixed butenes, and 288 parts by weight of sulfur were charged into an autoclave and heated at a temperature of about 170° C. for 24 hours. The butylene dimer product employed contained about 57 per cent by weight of mixed 2,4,4-trimethyl-pentene-1 and 2,4,4-trimethyl-pentene-2, and had the following characteristics:

| | |
|---|---|
| Specific gravity, 60/60° F | 0.716 |
| Boiling range, °F | 187–234 |
| Bromine number | 140.9 |

During the heating period, the maximum pressure developed within the autoclave was about 75 pounds per square inch. Upon completion of the heating, the autoclave was cooled and there was withdrawn approximately 608 parts by weight of a crude reaction product. This product was filtered, whereby there was obtained approximately 137 parts by weight of a solid product. This product was dissolved in diethyl ether and filtered to remove free sulfur. The filtered solution was then heated to evaporate the ether, whereby there was obtained approximately 85 parts by weight of an orange-colored solid. This product was purified by several recrystallizations from diethyl ether solution, whereby there was obtained a crystalline material having a melting point of 86.5° C., and which was found to be identical with the $C_8H_{12}S_3$ compound prepared as described in Example II. An additional quantity of this compound as well as a quantity of the isomer of 80° C. melting point may be recovered from the liquid portion of the initial reaction product by treatment as described in Example I.

As hereinbefore stated, both of the $C_8H_{12}S_3$ compounds, as well as mixtures thereof, are useful as additive agents in certain hydrocarbon fuel compositions. It has been found that these products when added in small amounts to petroleum oil fractions of the Diesel fuel range have the property of decreasing the ignition delay period of such fuels as indicated by an increase in the cetane number of the fuel. Ordinarily, the $C_8H_{12}S_3$ compounds, or mixtures thereof, are added to the fuel in an amount representing between about 1 and about 5 per cent by weight of the entire composition, although in fuels for heavy-duty continuously-operating Diesel engines the proportion of additive may be increased to as much as 10 per cent by weight. In such case it is preferable to employ a mixture of the two compounds, conveniently the mixture initially isolated from the crude liquid reaction product, since such mixtures are more soluble in hydrocarbon fuel oils than either of the separate compounds, and hence have less tendency to separate out of solution during shipping and storage of the fuel composition. The following solubility data illustrate this property:

| | Material | Parts by weight soluble at 28° C. in 100 parts of Mid-Continent gas-oil fuel base |
|---|---|---|
| 1 | $C_8H_{12}S_3$, M. P.=87° C | 3.8 |
| 2 | $C_8H_{12}S_3$, M. P.=80° C | 5.7 |
| 3 | Mixture consisting of: 50% by wt. of (1) and 50% by wt. of (2) | 12.3 |

The following table presents data illustrating the use of one of the new compounds and a mixture thereof with the other as cetane number improvement agents in a typical Diesel fuel composition. These data were obtained by determining the cetane number, as described in SAE Journal, June, 1936, page 225, of the compositions set forth in the table.

*Table*

| | Composition I | Composition II | Composition III |
|---|---|---|---|
| Fuel Base, per cent by wt | 100 | 97.88 | 95.76 |
| Additive Employed | None | $C_8H_{12}S_3$ M. P. 87° C. | Mixed $C_8H_{12}S_3$ Compounds [1] |
| Additive, per cent by wt | | 2.12 | 4.24 |
| Gravity, °API | 31.7 | 31.0 | 31.1 |
| Pour Point, °F | −35 | −20 | −25 |
| Viscosity at 100° F., SUV | 38.5 | 38.6 | 39.0 |
| Cetane Number | 45.5 | 50.4 | 55.3 |
| Increase in Cetane No. over Base Fuel | 0 | 4.9 | 9.8 |

[1] Mixture comprised approximately 60 per cent by weight of high-melting isomer and approximately 40 per cent by weight of low-melting isomer.

Other modes of applying the principle of our invention may be employed instead of those explained, change being made as regards the materials or methods employed provided the product stated by any of the following claims be obtained or the step or steps stated by any of the following claims be employed.

We therefore, particularly point out and distinctly claim as our invention:

1. A sulfur-containing chemical product selected from the group consisting of (1) 4-neopentyl-1,2-dithia-4-cyclopentene-3-thione, (2) 4-methyl-5-tert-butyl-1,2-dithia-4-cyclopentene-3-thione, and (3) a mixture of (1) and (2).

2. As a new chemical compound, 4-neopentyl-1,2-dithia-4-cyclopentene-3-thione.

3. As a new chemical compound, 4-methyl-5-tert-butyl-1,2-dithia-4-cyclopentene-3-thione.

4. An orange-colored crystalline solid product consisting of a mixture of the two isomeric crystalline solid compounds 4-neopentyl-1,2-dithia-4-cyclopentene-3-thione and 4-methyl-5-tert-butyl-1,2-dithia-4-cyclopentene-3-thione.

5. The process which comprises heating a mixture of sulfur and di-isobutylene at a reaction temperature above about 140° C. and under autogenic pressure, dissolving the reaction product so obtained in an organic solvent, cooling the resulting solution to cause precipitation of an orange-colored crystalline product having a melting point between about 50° C. and about 70° C. and consisting predominantly of a mixture of 4-neopentyl-1,2-dithia-4-cyclopentene-3-thione and 4-methyl-5-tert-butyl-1,2-dithia-4-cyclopentene-3-thione, and separating said crystalline product from the mother liquor.

6. The process which comprises heating a mixture of sulfur and di-isobutylene at a temperature between about 140° C. and about 350° C. and under autogenic pressure, dissolving the reaction product so obtained in an organic solvent, cooling the resulting solution to cause precipitation of an orange-colored crystalline product having a melting point between about 50° C. and about 70° C. and consisting predominantly of a mixture of 4-neopentyl-1,2-dithia-4-cyclopentene-3-thione and 4-methyl-5-tert-butyl-1,2-dithia-4-cyclopentene-3-thione, and separating said crystalline product from the mother liquor.

7. The process which comprises heating a mixture of sulfur and di-isobutylene at a temperature between about 140° C. and about 350° C. and under autogenic pressure for from about 10 minutes to about 10 hours, between about 1 and about 5 moles of sulfur being employed per mole of diisobutylene, dissolving the reaction product so obtained in an organic solvent, cooling the resulting solution to cause precipitation of an orange-colored crystalline product having a melting-point between about 50° C. and about 70° C. and consisting predominantly of a mixture of 4-neopentyl-1,2-dithia-4-cyclopentene-3-thione and 4-methyl-5-tert-butyl-1,2-dithia-4-cyclopentene-3-thione, and separating said crystalline product from the mother liquor.

8. The process which comprises heating a mixture of sulfur and di-isobutylene in a molecular ratio of about 2.5 moles of sulfur per mole of di-isobutylene at a temperature between about 140° C. and about 200° C. and under autogenic pressure for from about 3 to about 5 hours, dissolving the reaction product so obtained in an organic solvent, cooling the resulting solution to cause precipitation of an orange-colored crystalline product having a melting point between about 50° C. and about 70° C. and consisting predominantly of a mixture of 4-neopentyl-1,2-dithia-4-cyclopentene-3-thione and 4-methyl-5-tert-butyl-1,2-dithia-4-cyclopentene-3-thione, and separating said crystalline product from the mother liquor.

9. The process which comprises heating a mixture of sulfur and di-isobutylene at a temperature between about 140° C. and about 350° C. and under autogenic pressure, dissolving the crude reaction product so obtained in an organic solvent and cooling the resulting solution to cause precipitation of a crystalline product consisting predominantly of a mixture of 4-neopentyl-1,2-dithia-4-cyclopentene-3-thione and 4-methyl-5-tert-butyl-1,2-dithia-4-cyclopentene-3-thione, separating said product from the mother liquor and dissolving it in chloroform, cooling the resulting solution to cause precipitation of 4-neopentyl-1,2-dithia-4-cyclopentene-3-thione, separating said 4-neopentyl-1,2-dithia-4-cyclopentene-3-thione from the mother liquor, and recovering from said mother liquor the 4-methyl-5-tert-butyl-1,2-dithia-4-cyclopentene-3-thione.

10. The process which comprises heating a mixture of sulfur and di-isobutylene in a molar ratio of between about 1 and about 5 moles of sulfur per mole of di-isobutylene at a temperature between about 140° C. and about 350° C. and under autogenic pressure for from about 10 minutes to about 10 hours, dissolving the crude reaction product so obtained in an organic solvent and cooling the resulting solution to cause precipitation of a crystalline product consisting predominantly of a mixture of 4-neopentyl-1,2-dithia-4-cyclopentene-3-thione and 4-methyl-5-tert-butyl-1,2-dithia-4-cyclopentene-3-thione, separating said product from the mother liquor and dissolving it in chloroform, cooling the resulting solution to cause precipitation of the 4-neopentyl-1,2-dithia-4-cyclopentene-3-thione, separating said 4-neopentyl-1,2-dithia-4-cyclopentene-3-thione from the mother liquor, and recovering from said mother liquor the 4-methyl-5-tert-butyl-1,2-dithia-4-cyclopentene-3-thione.

11. The process which comprises heating a mixture of sulfur and di-isobutylene in a molar ratio of between about 1 and about 5 moles of sulfur per mole of di-isobutylene at a temperature between about 140° C. and about 350° C. and under autogenic pressure for from about 10 minutes to about 10 hours, dissolving the crude reaction product so obtained in an organic solvent and cooling the resulting solution to cause precipitation of a crystalline product consisting predominantly of a mixture of 4-neopentyl-1,2-dithia-4-cyclopentene-3-thione and 4-methyl-5-tert-butyl-1,2-dithia-4-cyclopentene-3-thione, separating said product from the mother liquor and recrystallizing it at least once from solution in chloroform to obtain the 4-neopentyl-1,2-dithia-4-cyclopentene-3-thione, heating the chloroform mother liquors to evaporate the chloroform therefrom, and recrystallizing the residue at least once from solution in an organic solvent to obtain the 4-methyl-5-tert-butyl-1,2-dithia-4-cyclopentene-3-thione.

12. The method of separating 4-neopentyl-1,2-dithia-4-cyclopentene-3-thione from a mixture thereof with 4-methyl-5-tert-butyl-1,2-dithia-4-cyclopentene-3-thione, which comprises dissolving said mixture in chloroform, cooling the resulting solution to cause precipitation of said 4-neopentyl-1,2-dithia-4-cyclopentene-3-thione, and separating said 4-neopentyl-1,2-dithia-4-cyclopentene-3-thione from the mother liquor.

13. The method of separating 4-neopentyl-1,2-dithia-4-cyclopentene-3-thione and 4-methyl-5-tert-butyl-1,2-dithia-4-cyclopentene-3-thione from a mixture thereof, which comprises dissolving said mixture in chloroform, cooling the resulting solution to cause precipitation of the 4-neopentyl-1,2-dithia-4-cyclopentene-3-thione, separating said compound from the mother liquor, and recovering from said mother liquor the 4-methyl-5-tert-butyl-1,2-dithia-4-cyclopentene-3-thione.

DONALD R. STEVENS.
WILLIAM C. STARNES.

REFERENCES CITED

The following references are of record in the file of this patent:

UNITED STATES PATENTS

| Number | Name | Date |
| --- | --- | --- |
| 2,402,456 | Signaigo | June 18, 1946 |